United States Patent [19]

Nelson

[11] 4,355,953
[45] Oct. 26, 1982

[54] FLOW-ADJUSTED HYDRAULIC ROTARY MACHINE

[75] Inventor: Richard M. Nelson, Portland, Oreg.

[73] Assignee: Guy F. Atkinson Company, Portland, Oreg.

[21] Appl. No.: 138,174

[22] Filed: Apr. 7, 1980

[51] Int. Cl.³ .............................................. F04D 29/56
[52] U.S. Cl. .................................... 415/164; 415/211
[58] Field of Search ............... 415/163, 164, 162, 161, 415/160, 149 R, 207, 211, 148, 150, 159

[56] References Cited

U.S. PATENT DOCUMENTS

| | | |
|---|---|---|
| 109,099 | 11/1970 | Barber . |
| 1,762,121 | 6/1930 | Gross . |
| 2,371,706 | 3/1945 | Planiol ................................ 415/162 |
| 2,733,853 | 2/1956 | Trumpler . |
| 2,976,013 | 3/1961 | Hunter ................................ 415/163 |
| 2,985,427 | 5/1961 | Houghton . |
| 3,204,931 | 9/1965 | Edvardson . |
| 3,232,581 | 2/1966 | Swearington . |
| 3,588,269 | 6/1971 | Wall ................................... 415/161 |
| 3,639,075 | 2/1972 | Erwin et al. ...................... 415/163 |
| 3,756,739 | 9/1973 | Boussuges ......................... 415/161 |
| 3,936,223 | 2/1976 | Baghdadi ........................... 415/207 |
| 3,992,128 | 11/1976 | Lunsford et al. ................... 415/161 |

FOREIGN PATENT DOCUMENTS

| | | |
|---|---|---|
| 95040 | 12/1960 | Czechoslovakia . |
| 109925 | 11/1964 | Czechoslovakia . |
| 181645 | 3/1906 | Fed. Rep. of Germany . |
| 191006 | 11/1906 | Fed. Rep. of Germany . |
| 284191 | 11/1952 | Switzerland . |

*Primary Examiner*—Louis J. Casaregola
*Assistant Examiner*—Jeffrey A. Simenauer
*Attorney, Agent, or Firm*—Klarquist, Sparkman, Campbell, Leigh, Whinston & Dellett

[57] ABSTRACT

Adjustable guide vanes (70) are circumferentially disposed about a rotor (40) at each stage of a multi-stage turbine (10) and are slidably connected to pairs of rotatable vane rings (61, 62) at each stage, the rings and guide vanes defining nozzles (82) leading from a scroll case (30) to the rotor at each stage, the nozzles having contoured surfaces (80) for minimizing hydraulic losses. Yoke mechanisms (104, 106) and interconnecting members (98, 100) link each pair of rotatable vane rings to a single actuator shaft (90) for synchronous adjustment of the positions of the guide vanes to vary the cross-sectional areas of the nozzles thereby permitting operation at optimum efficiency in response to changing flow rates.

10 Claims, 10 Drawing Figures

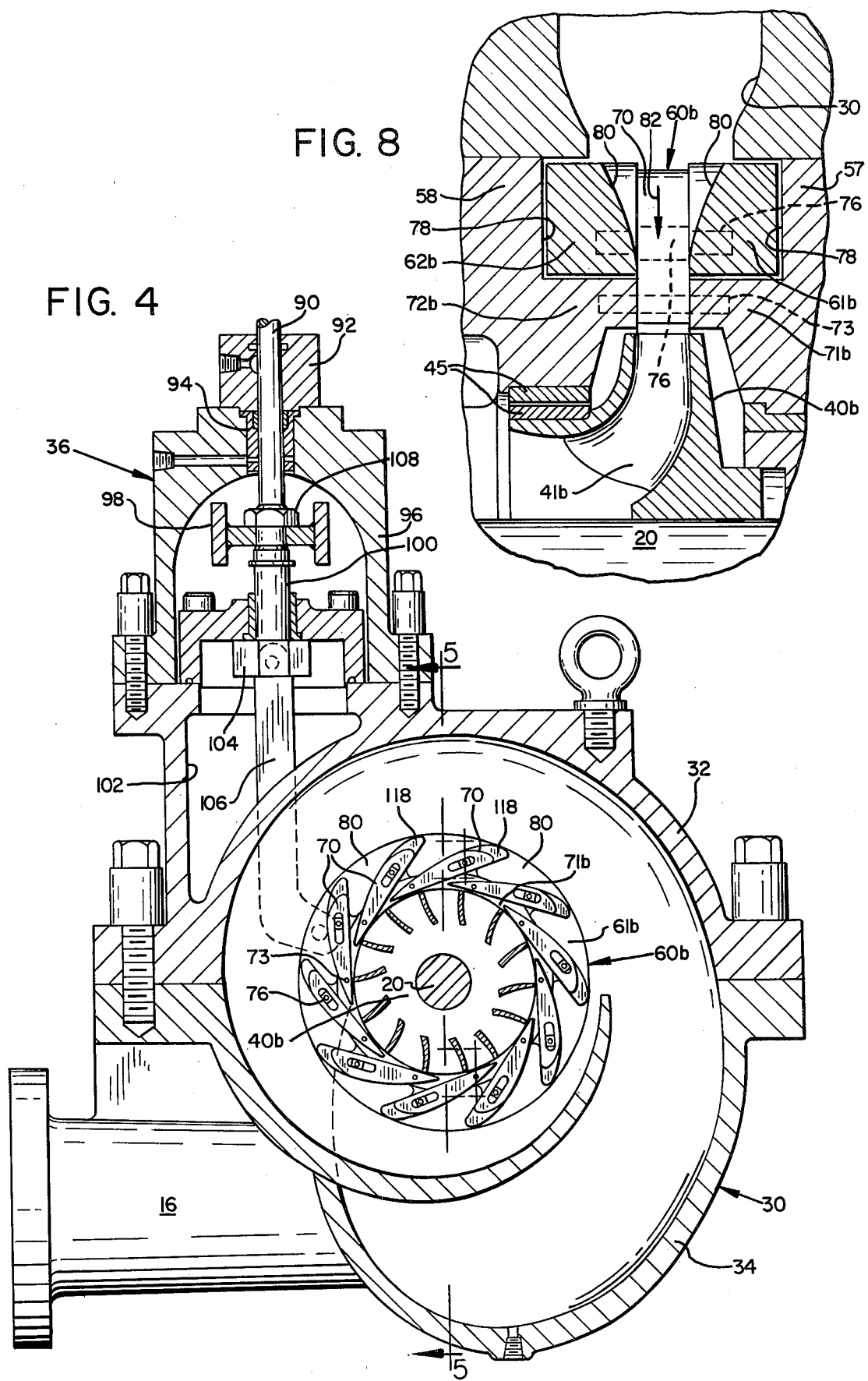

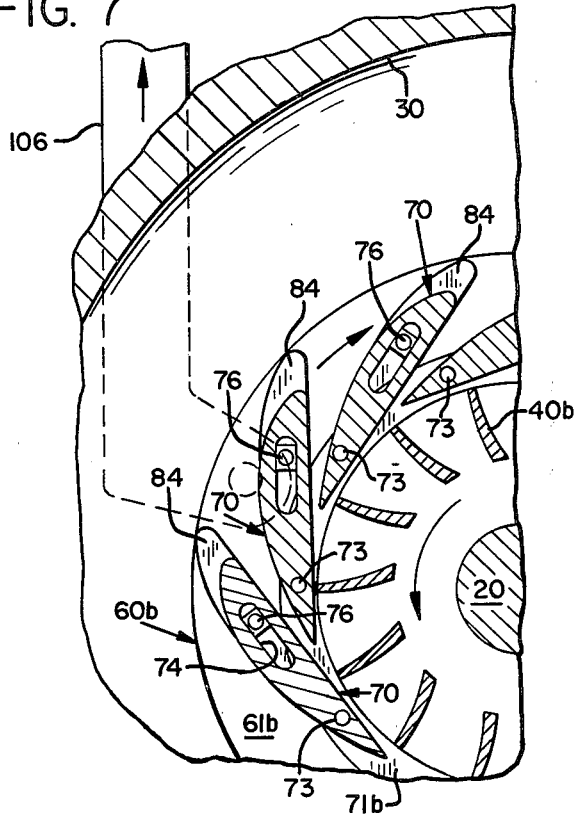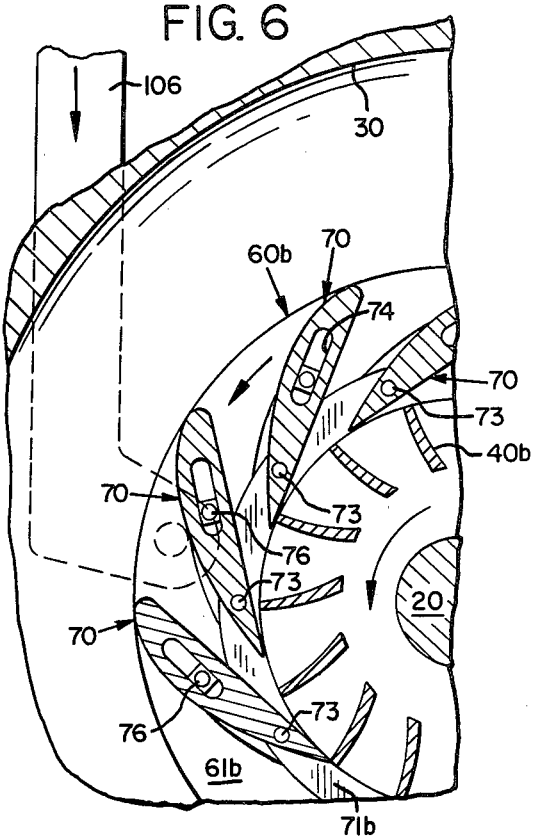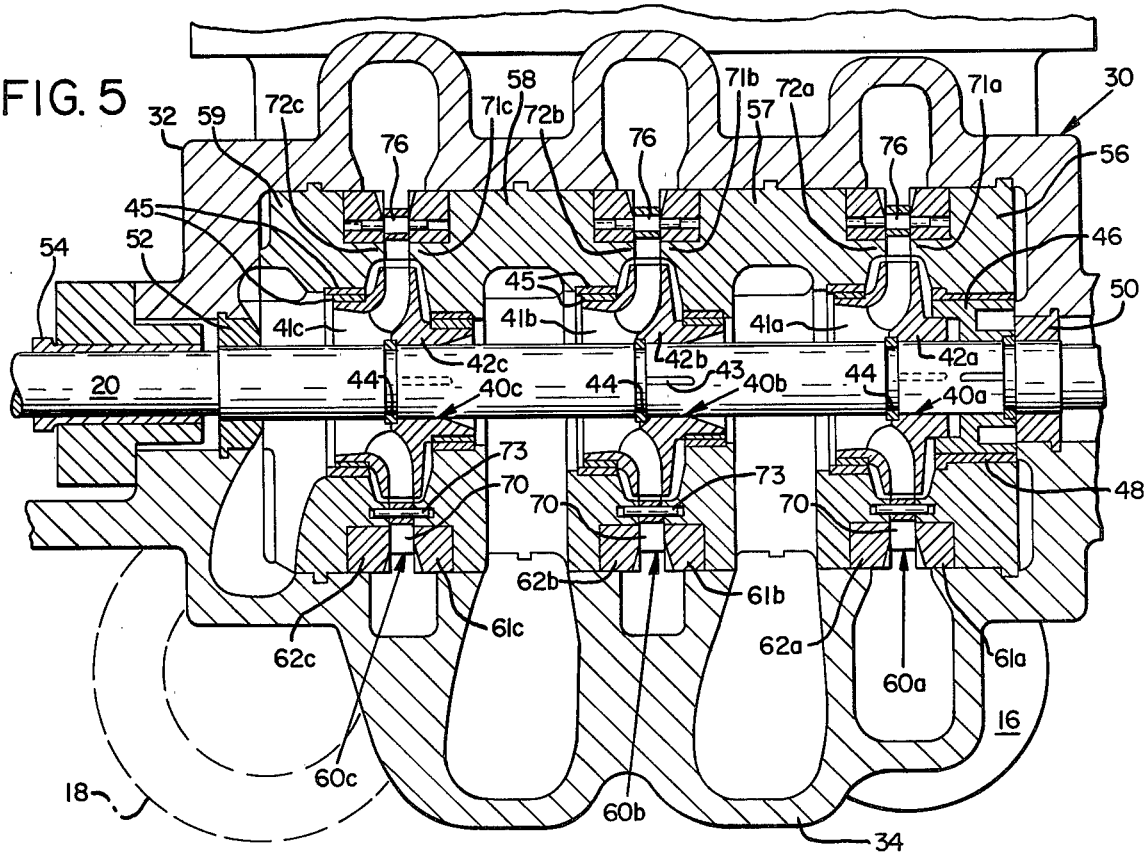

FLOW-ADJUSTED HYDRAULIC ROTARY MACHINE

The present invention pertains generally to hydraulic rotary machines, and more particularly to turbines employing variable-position guide vanes for adjusting the cross-sectional area of nozzle pasages leading to a rotor.

It is a principal object of the invention to provide a hydraulic rotary machine with improved operating efficiency over a wide flow range.

Another object of the invention is to provide a more efficient hydraulic rotating machine having adjustable guide vanes.

Another object of the invention is to provide a multi-stage hydraulic rotary machine having adjustable guide vanes.

Another object of the invention is to provide a hydraulic rotary machine having a plurality of streamlined hydraulic passages which are disposed between adjustable guide vanes and are contoured for minimizing hydraulic losses attributable to flow separation and sudden changes in flow direction.

Another object of the invention is to provide an improved mechanism for adjusting the position of the guide vanes in a hydraulic rotary machine.

Another object of the invention is to provide an improved mechanism for adjusting the position of guide vanes in a multi-stage hydraulic rotary machine simultaneously in each stage.

Other objects and advantages of the invention will become apparent upon consideration of an illustrative embodiment thereof described in conjunction with the accompanying drawings, in which:

FIG. 4 is a vertical cross-section of the machine taken along line 4—4 of FIG. 2;

FIG. 5 is a vertical cross-section of the machine taken along line 5—5 of FIG. 1;

FIGS. 6 and 7 are fragmentary radial sections of a portion of the machine illustrating guide vanes in extreme positions;

FIG. 8 is a fragmentary axial section of a portion of the machine taken similar to the view of FIG. 5.

The present invention will be described by way of an illustrative embodiment of a hydraulic rotary machine primarily intended to serve as a power recovery turbine. Those skilled in the art will appreciate, however, that the invention is also applicable to related fluid-flow machines such as centrifugal pumps.

The potential for power recovery exists anytime a liquid flows from a higher pressure to a lower pressure in such a manner that throttling occurs. It is known that the efficiency of a power recovery turbine can be maximized for different through-flow conditions by maintaining an essentially constant pressure differential across the turbine.

Figure 1:
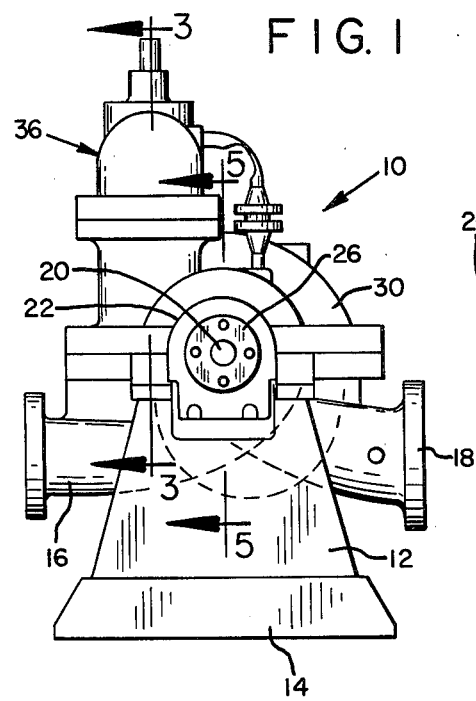
FIGS. 1 and 2 are end and side elevations of a hydraulic rotary machine in accordance with the invention.
Figure 2:
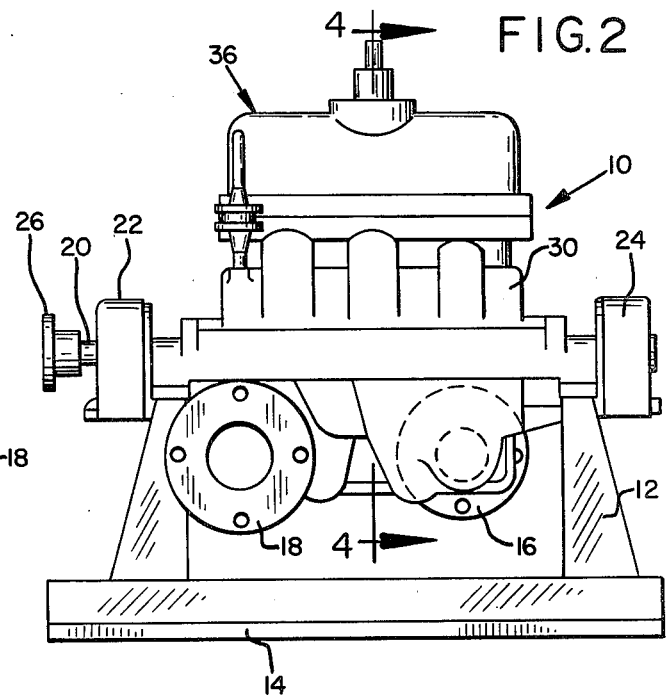

With reference to FIGS. 1 and 2, a power recovery turbine in accordance with the invention is illustrated and designated generally by reference numeral 10. The turbine 10 is supported by a frame 12 and a base 14 and includes manifolds 16 and 18 for fluid inlet and discharge. The energy in a stream of fluid flowing through the turbine 10 from the inlet manifold 16 to the discharge manifold 18 is converted to rotary mechanical power on an output shaft 20. Bearing housings 22 and 24 encase conventional bearings (not shown) for supporting the opposite ends of the shaft 20. A conventional coupling 26 is provided on the drive end of the shaft 20 for interconnection with a load, such as a generator or pump.

Figure 3:
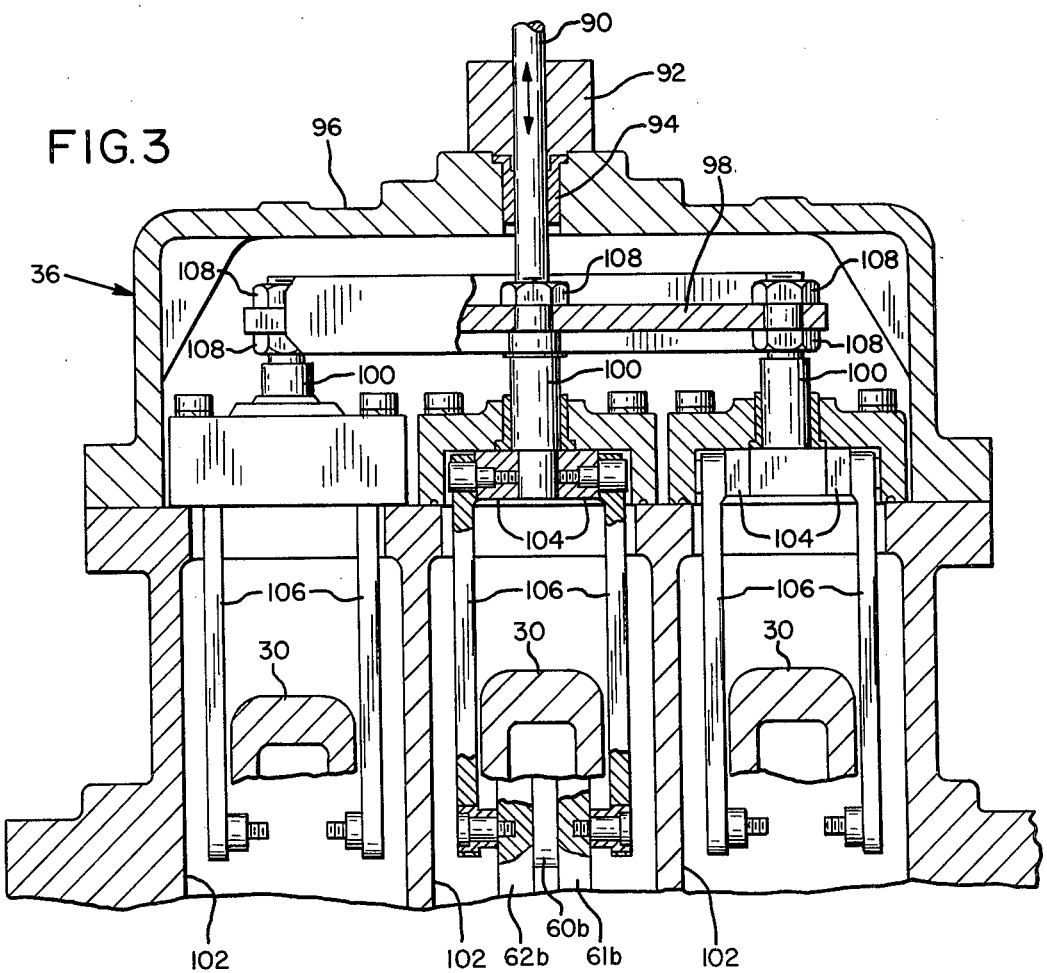
FIG. 3 is a vertical cross-section of the machine taken along line 3—3 of FIG. 1.

With reference to FIGS. 3-5, the turbine 10 includes a scroll case 30 having axially joined upper and lower case sections 32 and 34 which house a plurality of rotary stages. In the present example, there are three such stages. It will be appreciated, however, that the invention is not limited to multi-stage machines but contemplates single-stage machine applications as well. The inlet and discharge manifolds 16 and 18 adjoin the lower case section 34. Disposed atop the upper case section 32 is a linear actuator assembly designated generally by reference numeral 36.

With particular reference to FIG. 5, the three stages are provided with bladed rotors 40a, 40b, and 40c having respective rotor eyes 41a, 41b, and 41c and rotor hubs 42a, 42b, and 42c, the hubs being secured to the shaft 20 in a conventional manner by means of keys 43 and thrust rings 44. Other essentially conventional elements include wear rings 45, a drum 46 keyed to the shaft 20 for balancing axial thrust, a balance drum bushing 48, and inlet and outlet throat bushings 50 and 52. FIG. 5 also shows a conventional mechanical seal 54 at the drive end of the shaft 20. Secured in the scroll case 30 are stage pieces 56, 57, 58 and 59. Circumferentially disposed about the rotors 40a, 40b, and 40c are respective guide vane assemblies 60a, 60b, and 60c. The guide vane assemblies include respective pairs of rotatable vane rings designated 61a and 62a at the first stage, 61b and 62b at the second stage, and 61c and 62c at the third stage. Each guide vane assembly has a circumferential arrangement of guide vanes 70. In the present example, there are ten such guide vanes arranged uniformly in the shape of a pinwheel in each stage as seen in FIG. 4. The stage pieces 56-59 have portions defining pairs of stationary vane rings corresponding to the rotatable vane rings as seen in FIG. 5 and designated 71a and 72a at the first stage, 71b and 72b at the second stage, and 71c and 72c at the third stage.

Referring to FIGS. 6-8, representative features of the guide vane assembly 60b will be described. Each guide vane 70 is pivotally secured by a pivot pin 73 retained in the adjacent walls of the stationary vane rings 71b and 72b. Each guide vane 70 has a slot 74 through which a slide pin 76 extends, the slide pin being pivotally secured in the adjacent walls of the rotatable vane rings 61b and 62b. The rotatable vane rings are slidably carried within annular recesses 78 defined by the stage pieces 57 and 58 and the scroll case 30.

Figure 9:
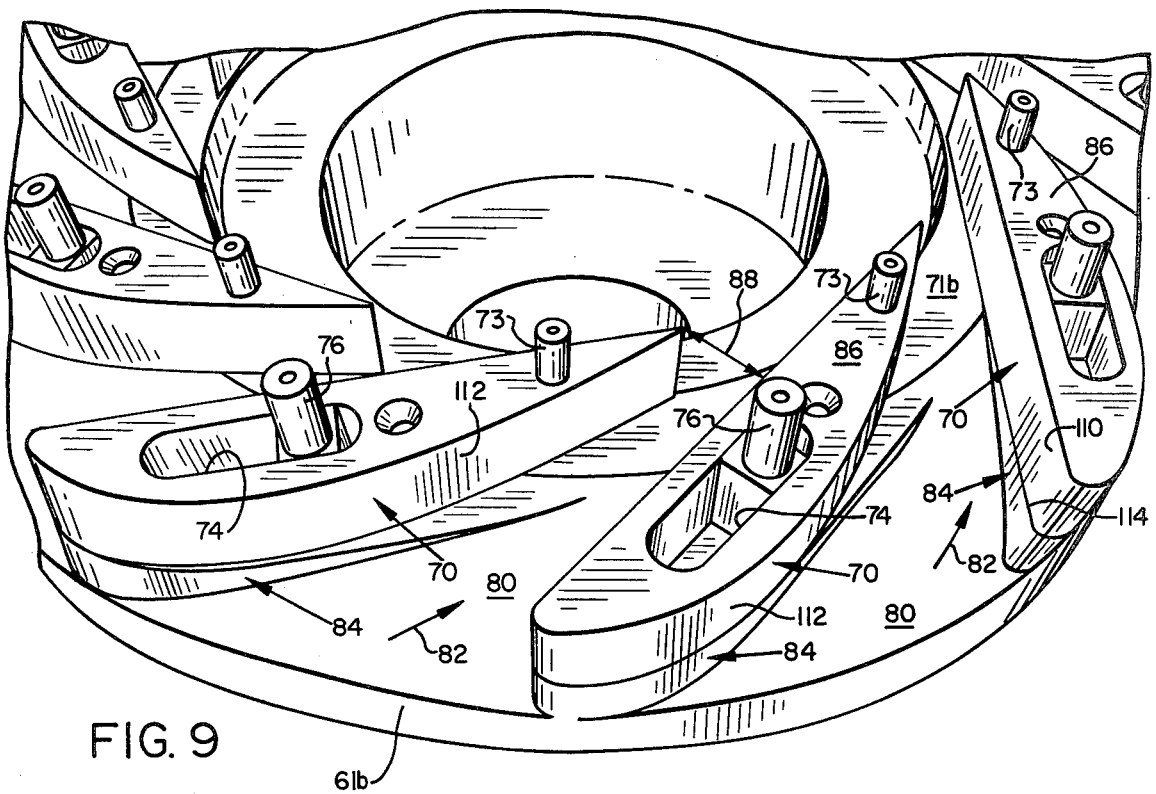
FIGS. 9 and 10 are fragmentary perspective views of a partially assembled guide vane assembly of the machine showing guide vanes in extreme positions.
Figure 10:
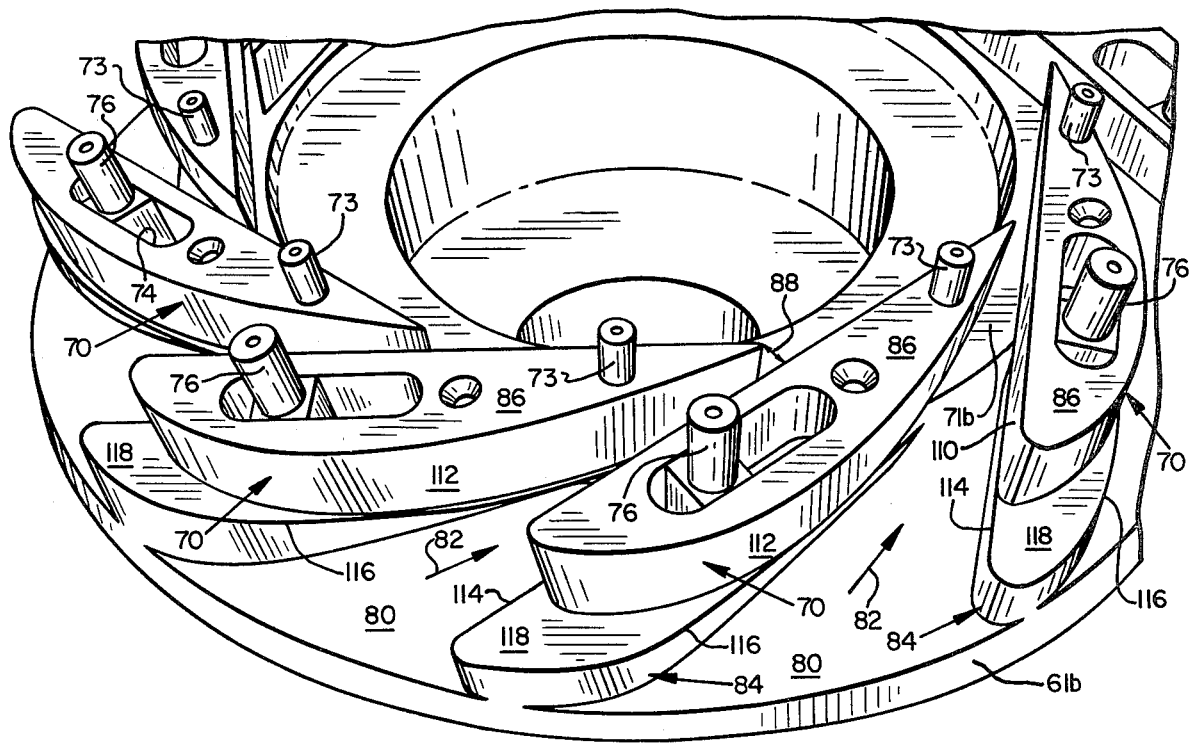

Referring to FIGS. 9 and 10, it will be seen that each rotatable vane ring has contoured surfaces 80 which together with adjacent guide vanes 70 form constricted fluid passageways or nozzles as indicated by the arrows 82. Each rotatable vane ring also has a raised portion or pedestal 84 associated with each guide vane 70. The guide vanes 70 have planar surfaces 86 which lie in radial planes and slidably abut the pedestals 84. Those skilled in the turbine art will appreciate that hydraulic losses in the fluid flowing through the nozzles 82 will be minimized by virtue of the hydraulic shaping provided by the contoured surfaces 80 and the complementary shapes of the guide vanes 70 and associated pedestals 84. This feature will be elaborated upon below.

The cross-sectional area of each nozzle 82 becomes progressively smaller while moving inwardly and becomes smallest at a throat 88 defined by the innermost axial edge of each guide vane and the most proximate surface portions of the adjacent guide vane, as indicated by the double-pointed arrows in FIGS. 9 and 10. FIGS. 6 and 9 show the guide vanes 70 in the extreme position wherein the nozzle throats have a maximum cross-sectional area. FIGS. 4, 7 and 10 show the guide vanes 70 in the extreme position wherein the nozzle throats have a minimum cross-sectional area. It will be appreciated that the efficiency of the turbine 10 can be optimized over a wide flow range by adjusting the positions of the guide vanes to select the optimum fluid velocity as determined by the cross-sectional area of the nozzle throats 88.

In accordance with an important feature of the invention, the position of the guide vanes 70 in each stage can be adjusted simultaneously by means of the linear actuator assembly 36, the details of which will now be described with particular reference to FIGS. 3 and 4. The assembly 36 includes a main actuator shaft 90 whose vertical position is controlled from above in a suitable manner, such as by means of a manual crank mechanism (not shown). Alternatively, a suitable electrical or pneumatic control mechanism (not shown) can be employed to adjust the vertical travel of the shaft 90. The shaft 90 passes through a gland 92 and a stuffing box 94 into an upper chamber defined by a cover 96. The shaft 90 is secured to an I-shaped cross beam 98 to which three drive shafts 100 are connected. Each drive shaft extends into a lower chamber 102 to engage a respective yoke block 104 from which a pair of pivotally mounted yoke arms 106 extend downward to engage respective rotatable vane rings. For example, FIG. 3 expressly shows the middle pair of yoke arms journaled to the rotatable vane rings 61b and 62b of the second stage.

It will be apparent from studying the views of FIGS. 4, 6 and 7 that a vertical adjustment of the position of the shaft 90 will cause pivotal movement of the guide vanes 70 about their stationary pivot pins 73. In FIG. 6, the rotatable vane ring 61b has been rotated counterclockwise by the downward movement of its associated yoke arm 106 causing the guide vanes 70 to pivot to their maximum throat opening for optimum efficiency at a relatively high flow rate. In FIG. 7, the ring 61b has been rotated clockwise by the upward movement of the arm 106 causing the guide vanes 70 to pivot to their minimum throat opening for optimum efficiency at a relatively low flow rate.

Referring again to FIG. 3, an important advantage of the actuator assembly 36 will be described. The relative vertical positions of the drive shafts 100 can be adjusted by means of jam nuts 108 which secure the drive shafts 100 to the cross beam 98. Accordingly, it is possible to provide throat openings having different cross-sectional areas from stage to stage to allow for an increase in specific volume when the pressure reduces from stage to stage, thereby further optimizing performance. However, it will be appreciated that any such dissimilar settings between stages will limit somewhat the overall range of flow control. Each drive shaft 100 is preferably provided with stops (not shown) to limit travel to the full range of nozzle throat openings in the respective stage. The full range of control for each stage is achieved when the drive shafts 100 are adjusted relative to the cross beam 98 in order to equalize the throat openings in all three stages at all positions of adjustment.

Referring again to FIGS. 9 and 10, another important feature of the invention will be described. Each guide vane 70 has a flat surface 110 which faces inward and a curved surface 112 which faces outward. The flat surface 110 is aligned essentially parallel to a straight edge 114 of the associated pedestals 84 on each side of the guide vane 70. Likewise, the curved surface 112 of each guide vane 70 conforms generally to the contour of a curved edge 116 of the associated pedestals 84 on each side of the guide vane 70. The slot 74 of each guide vane 70 is oriented parallel to the flat surface 110 and is adapted for slidable movement with the pin 76 so that the flat surface 110 of the guide vane 70 will maintain its essentially parallel orientation with respect to the straight edge 114 of the associated pedestals 84 throughout the range of movement of the guide vane 70. In the preferred embodiment, the full range of the guide vane movement requires only a 9° range of rotation of the rotatable vane rings. As the guide vanes move toward the minimum nozzle throat opening shown in FIG. 10, outer portions of the pedestals 84 increasingly become uncovered leaving planar shelves 118 at the entrances to the nozzles 82. Since the velocity of the fluid is slowest at the entrances to the nozzles 82, the emergence of these shelves 118 will have negligible effect on performance.

It will be appreciated from the foregoing that, for all guide vane settings, the nozzles 82 will exhibit a streamlined shape not only in radial planes between the surfaces of adjacent guide vanes 70 but also in axial planes between facing pairs of contoured surfaces 80 at each nozzle. In other words, the contoured surfaces 80 will be seen to taper so that the axial dimension of each nozzle 82 becomes progressively narrower in moving inwardly. Streamlining of the nozzles 82 minimizes the hydraulic losses attributable to flow separation and sudden changes in flow direction. Furthermore, in order to maintain optimum flow direction for the fluid impinging on the rotor blades, it will be appreciated that the flat surfaces 110 of the guide vanes 70 will remain essentially tangential to the periphery of the respective rotor in all positions of adjustment of the guide vanes. The combined effect of superior streamlining and optimum flow direction significantly improves the hydraulic efficiency of the turbine 10, which is a measure of the power exerted on the rotor blades relative to the power of the entering fluid.

A further advantage of the invention is the provision of two rotatable vane rings at each stage. This feature permits adjustment of the guide vane assemblies with minimum effort and permits the advantageous nozzle-shaping provided by the contoured surfaces 80 and the pedestals 84. It will be appreciated that simultaneous rotation of the rotatable vane rings at each stage keeps the contoured surfaces 80 in a mirror-imaged relationship at each nozzle 82, thereby maintaining optimum symmetry for streamlined flow.

An inherent advantage of the invention is the tendency of the rotatable vane rings to hold the guide vanes 70 by a clamping action induced by a pressure differential caused by the increased velocity of the fluid passing through the restricted passageways of the nozzles. Those skilled in the art will appreciate that the pressure in the annular recesses 78 will be greater than the pressure in the nozzles 82 so that an axial force is applied to each rotatable vane ring in the direction toward the guide vanes. Such forces are sufficient to prevent undesirable vane flutter but do not restrict adjustment of the guide vane positions during continuous operation.

From the foregoing description of a presently preferred embodiment, it will be apparent that the invention provides a unique hydraulic rotary machine with improved operating efficiency over a wide flow range. Those skilled in the art will recognize many advantages of the inventive machine beyond those specifically mentioned above. Although a preferred embodiment of the invention has been described in detail, it is to be understood that various changes, substitutions, and alterations can be made therein without departing from the spirit and scope of the invention as defined in the appended claims.

What is claimed is:

1. A hydraulic rotary machine comprising:
   a case defining a stage in fluid communication between an inlet and a discharge;
   a shaft rotatably disposed in the case and extending through the stage;
   a bladed rotor secured to the shaft for rotation within the stage;
   a plurality of guide vanes uniformly spaced circumferentially about the rotor and generally tangentially oriented with respect to the periphery of the rotor;
   a pair of stationary vane rings axially positioned on opposite sides of the guide vanes and surrounding the rotor;
   pivot means for pivotally securing each guide vane to the stationary vane rings, each such pivot means having a pivot axis aligned parallel to the axis of the shaft;
   a pair of rotatable vane rings axially positioned on opposite sides of the guide vanes radially outward from the pivot means, the rotatable vane rings and the stationary vane rings having opposed surfaces which cooperate with opposing surfaces of adjacent guide vanes to define flow passageways,
   the opposed surfaces of the rotatable vane rings converging progressively toward one another and the opposing surfaces of the guide vanes converging progressively toward one another in a direction proceeding inwardly toward the bladed rotor such that the passageways maintain a streamlined shape and become progressively smaller in both radial and axial planes in such direction and in all positions of adjustment of the vanes; and
   slide means for slidably securing each guide vane to the rotatable vane rings so that a rotation of the rotatable vane rings relative to the stationary vane rings changes the minimum cross-sectional areas of the passageways between guide vanes.

2. A hydraulic rotary machine comprising:
   a case defining a stage in fluid communication between an inlet and a discharge;
   a shaft rotatably disposed in the case and extending through the stage;
   a bladed rotor secured to the shaft for rotation within the stage;
   a plurality of guide vanes uniformly spaced circumferentially about the rotor and generally tangentially oriented with respect to the periphery of the rotor;
   a pair of stationary vane rings axially positioned on opposite sides of the guide vanes and surrounding the rotor;
   pivot means for pivotally securing each guide vane to the stationary vane rings, each such pivot means having a pivot axis aligned parallel to the axis of the shaft;
   a pair of rotatable vane rings axially positioned on opposite sides of the guide vanes radially outward from the pivot means, the rotatable vane rings and the stationary vane rings having surfaces between guide vanes which cooperate with the surfaces of adjacent guide vanes to define no flow passageways, each such passageway exhibiting a progressively smaller flow cross-section in a direction proceeding inwardly toward the bladed rotor; and
   slide means for slidably securing each guide vane to the rotatable vane rings so that a rotation of the rotatable vane rings relative to the stationary vane rings changes the minimum cross-sectional areas of the passageways between guide vanes,
   the rotatable vane rings including pedestals associated with each guide vane and contoured surfaces extending between pedestals, the pedestals having planar shelves lying in radial planes, the guide vanes having planar surfaces lying in radial planes and slidably abutting the shelves of respective pedestals, the contoured surfaces associated with each passageway being axially separated by a distance which becomes progressively narrower in moving inwardly.

3. The machine of claim 2 wherein each guide vane has a flat surface which faces inward and a curved surface which faces outward so as to give each guide vane an essentially wing-shaped cross-section, the flat and curved surfaces being essentially perpendicular to the planar surfaces of each guide vane.

4. The machine of claim 3 wherein the pedestals have straight edges aligned essentially parallel to the flat surfaces of the associated guide vanes, and wherein each guide vane has a slot oriented parallel to its flat surface to slidably cooperate with the slide means to maintain the flat surface essentially parallel to the straight edge of the associated pedestal throughout the range of movement of the rotatable vane rings.

5. The machine of claim 1 wherein the case defines at least one successive stage similar to the first-mentioned stage and further comprises means for simultaneously rotating the rotatable vane rings of each stage to adjust the flow cross-section between the guide vanes of each stage.

6. An apparatus for generating rotary mechanical power from the energy in a stream of fluid, comprising:
   a plurality of stages in series fluid communication between an inlet manifold and an outlet manifold;
   a shaft;
   a bladed rotor associated with each stage and secured for rotation with the shaft;
   an assembly of guide vanes circumferentially disposed around each rotor and defining a plurality of nozzles for directing fluid tangentially against each rotor from a plurality of directions;
   a pair or rotatable vane rings associated with each stage and axially positioned on opposite sides of the guide vanes and having opposed surfaces which cooperate with opposing surfaces of adjacent guide vanes to define nozzles, the vane rings being slidably connected to the guide vanes;

the opposed surfaces of the vane rings converging progressively toward one another and the opposing surfaces of the guide vanes converging progressively toward one another in a direction proceeding inwardly toward the bladed rotor such that the nozzles maintain a streamlined shape and become progressively smaller in both radial and axial planes in such direction and in all positions of adjustment of the vanes, and a single actuator means operably connected to all rotatable vane rings for simultaneously adjusting the positions of the guide vanes to change the flow cross-sections of each nozzle in response to the flow rate of fluid through the apparatus, whereby operating efficiency can be optimized for various flow rates.

7. An apparatus for generating rotary mechanical power from the energy in a stream of fluid, comprising:
a plurality of stages in series fluid communication between an inlet manifold and an outlet manifold;
a shaft;
a bladed rotor associated with each stage and secured for rotation with the shaft;
an assembly of guide vanes circumferentially disposed around each rotor and defining a plurality of nozzles for directing fluid tangentially against each rotor from a plurality of directions; and
actuator means cooperating with each guide vane assembly for simultaneously adjusting the positions of the guide vanes to change the flow cross-sections of each nozzle in response to the flow rate of fluid through the apparatus, whereby operating efficiency can be optimized for various flow rates;
each guide vane assembly including a pair of opposed vane rings axially positioned on opposite sides of the guide vanes and rotatably disposed in annular recesses formed by interior walls of the apparatus, a plurality of axially oriented slide pins, each extending through a slot in a respective guide vane and each secured at its opposite ends in the opposed vane rings, and means for pivotally securing each guide vane so that rotation of the vane rings will change the relative positions of adjacent guide vanes thereby changing the flow cross-sections of the nozzles;
the vane rings having opposed surfaces which cooperate with opposing surfaces of adjacent guide vanes to define the nozzles;
the opposed surfaces of the vane rings converging progressively toward one another and the opposing surfaces of the guide vanes converging progressively toward one another in a direction proceeding inwardly toward the bladed rotor such that the nozzles maintain a streamlined shape and become progressively smaller in both radial and axial planes in such direction and in all positions of adjustment of the vanes.

8. The apparatus of claim 7 wherein the actuator means comprising:
yoke means for each guide vane assembly having arms journaled to the vane rings and adapted to rotate the vane rings by essentially tangential movement of the arms; and
interconnecting shaft means for simultaneously driving the yoke means of each guide vane assembly.

9. An apparatus for generating rotary mechanical power from the energy in a stream of fluid, comprising:
a plurality of stages in series fluid communication between an inlet manifold and an outlet manifold;
a shaft;
a bladed rotor associated with each stage and secured for rotation with the shaft;
an assembly of guide vanes circumferentially disposed around each rotor and defining a plurality of nozzles for directing fluid tangentially against each rotor from a plurality of directions; and
actuator means cooperating with each guide vane assembly for simultaneously adjusting the positions of the guide vanes to change the flow cross-sections of each nozzle in response to the flow rate of fluid through the apparatus, whereby operating efficiency can be optimized for various flow rates;
each guide vane assembly including a pair of opposed vane rings rotatably disposed in annular recesses formed by interior walls of the apparatus, a plurality of axially oriented slide pins, each extending through a slot in a respective guide vane and each secured at its opposite ends in the opposed vane rings, and means for pivotally securing each guide vane so that rotation of the vane rings will change the relative positions of adjacent guide vanes thereby changing the flow cross-sections of the nozzles;
the actuator means including yoke means for each guide vane assembly having arms journaled to the vane rings and adapted to rotate the vane rings by essentially tangential movement of the arms, and interconnecting shaft means for simultaneously driving the yoke means of each guide vane assembly,
the interconnecting shaft means including a main actuator shaft, a cross beam secured to the main actuator shaft and a drive shaft interconnecting the cross beam with each yoke means.

10. The apparatus of claim 9 further comprising means for presetting the positions of the drive shafts relative to each other to extend the yoke means of each guide vane assembly by a different amount to provide different flow cross-sections for the nozzles of the different stages.

* * * * *

UNITED STATES PATENT AND TRADEMARK OFFICE
CERTIFICATE OF CORRECTION

PATENT NO. : 4,355,953
DATED : October 26, 1982
INVENTOR(S) : RICHARD M. NELSON

It is certified that error appears in the above-identified patent and that said Letters Patent are hereby corrected as shown below:

Column 6, line 13, "no flow" should be deleted;
Column 8, line 4, "comprising" should be--comprises--;
Column 8, line 9, "interonnecting" should be--interconnecting--.

Signed and Sealed this

Twenty-eighth Day of December 1982

[SEAL]

Attest:

Attesting Officer

GERALD J. MOSSINGHOFF

Commissioner of Patents and Trademarks